Figure 2:
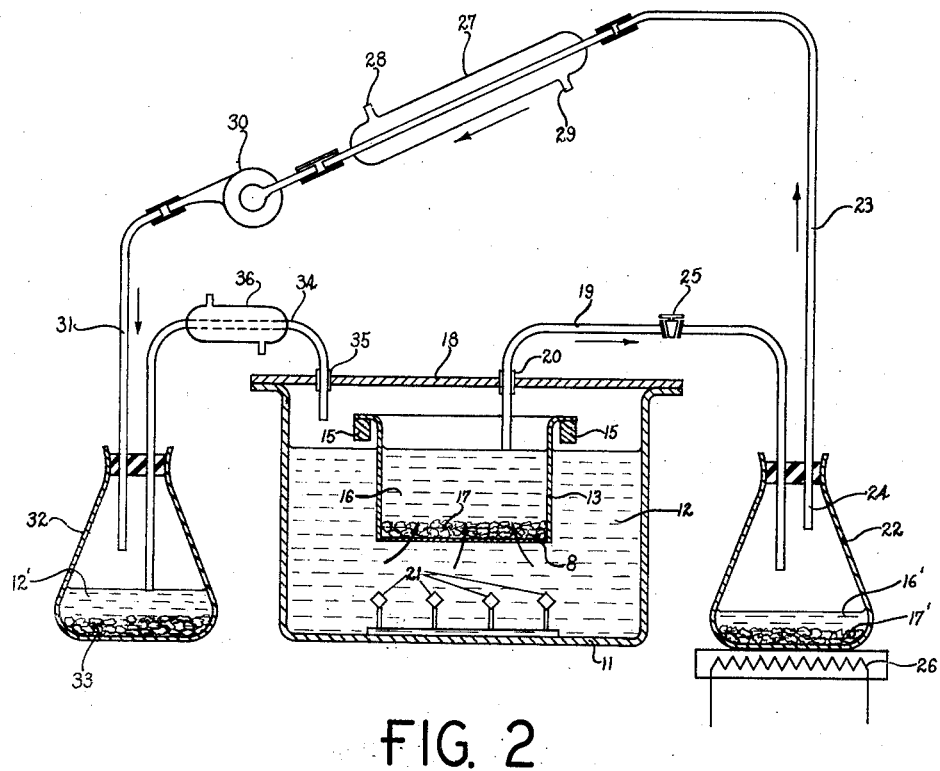

March 27, 1951    O. KORNEI    2,546,310
METHOD OF GROWING CRYSTALS
Filed March 21, 1945

INVENTOR.
OTTO KORNEI
BY
Eber J. Hyde
ATTORNEY

Patented Mar. 27, 1951

2,546,310

UNITED STATES PATENT OFFICE 2,546,310

METHOD OF GROWING CRYSTALS

Otto Kornei, Cleveland Heights, Ohio, assignor to The Brush Development Company, Cleveland, Ohio, a corporation of Ohio Application March 21, 1945, Serial No. 584,009

3 Claims. (Cl. 23—301)

My invention pertains to methods of growing crystals.

Two basic methods have been utilized for causing a crystal to grow from a solution. One is to gradually reduce the solubility of the solute, such as by reducing or, in some cases, by increasing the temperature of the solution, and the second is to gradually remove solvent from the solution, such as by evaporation. In either case the solution becomes more and more concentrated, then saturated, and finally supersaturated. When a certain degree of supersaturation is obtained all of the solute cannot be maintained in solution and some of it crystallizes out, either spontaneously as a large number of small crystals or slowly onto a small number of seed pieces of the crystalline material thereby leading to the growth of a small number of large crystals.

The first method is not universally operable as some substances have a solubility which changes only very little with temperature. Thus decreasing or increasing the temperature of a solution will have very little influence on crystallization therefrom. Also, this method cannot be made continuous due to the necessity of cyclically heating and cooling the solution.

The evaporation method, while it can be made practically continuous and works for most crystalline materials, has certain practical difficulties. The surface of the solution must be in contact with a gas (e. g., air) whose relative humidity is low. To maintain effective control over the humidity of the gas requires considerable equipment; the necessarily large free surface of the liquid in contact with the dry gas may also lead to the spontaneous formation of small crystals on the surface due to dust or dirt particles which are likely to accumulate and act as nuclei in this crystallization. If it is the object of the process to grow large crystals these small surface crystals are highly undesirable as they settle down and interfere with the growth of the planted seed pieces of crystalline material.

My invention provides a method, and the means for practicing the method, which combines the best features of the evaporation and temperature change methods of growing crystals.

The method is, consequently, primarily advantageous if crystals are to be grown at substantially constant temperature or if the substance to be crystallized shows only little change of its solubility with temperature. The growing of large crystals of substances with a very low absolute solubility is also facilitated by the method because of the simplicity and speed by which large quantities of solvent can be removed from the solution.

Another object of my invention is to provide a method of growing crystals, particularly large single crystals, which does not require a change in the temperature of the solution.

A further object of my invention is to substantially continuously grow crystals from a solution which is maintained at substantially constant temperature.

Figure 1:
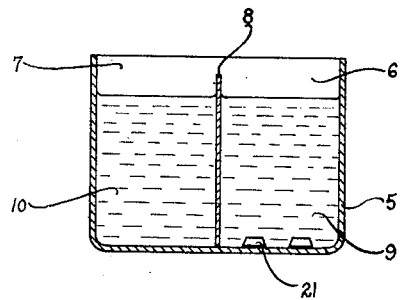
Figure 3:
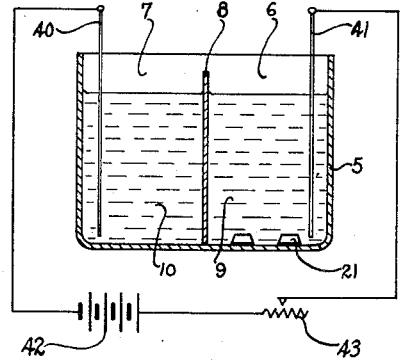

Other objects and a fuller understanding of my invention may be had by referring to the following description and claims, read in conjunction with the drawing wherein:

Figure 1 schematically illustrates means for growing crystals utilizing osmotic removal of solvent from the crystal solution, and Figure 3 illustrates a modification of the device shown in Figure 1.

Figure 2 illustrates a modified form of the invention wherein a substantially continuous process is possible.

Figure 1 illustrates a simple device for growing crystals utilizing osmotic removal of solvent from a solution. Reference character 5 indicates a container which is divided into two compartments 6 and 7 by a semi-permeable wall or membrane 8.

It should be remembered that a semi-permeable wall or membrane, generally speaking, permits the passage of the solvent of a solution but not of the solute. The perfection of this separation depends upon the nature of the membrane; the speed of the process depends also upon the membrane and in addition upon the difference between the osmotic pressures existing in the two solutions in contact with the opposite faces of the membrane. The osmotic pressure of a solution, in turn, is determined by its molar concentration and by the temperature. For dilute solutions of non-dissociating materials (non-electrolytes) the osmotic pressure is directly proportional, according to Van't Hoff's law, to the molar concentration and to the absolute temperature. Accordingly, the osmotic pressure of such a solution at room temperature, turns out to be approximately 25 atmospheres for a concentration of 1 gram-mole per liter solution.

For high concentrations and/or for solutions containing electrolytes the interdependence between concentration and osmotic pressure becomes more complicated and has to be established empirically in most cases.

Another factor by which the speed of transfer of liquid through the semi-permeable membrane can be increased is the application of a steady electric potential difference across the two "cells" which are separated by the membrane. The ensuing action is called electro-osmosis and it may be advantageously used in any of the modifications of the described crystal growing method. The basic set-up for practicing this method is shown in Figure 3, referred to later.

The compartment 6 in Figure 1 contains a first solution 9 and compartment 7 contains a second solution 10. The second solution may comprise some crystalline material dissolved, preferably, in the same kind of solvent which is in the first solution. In order that osmotic transfer of solvent from compartment 6 to compartment 7 be effected it is required that the second solution 10 have a higher osmotic pressure than the first solution 9. Pure solvent from solution 9 will then gradually pass through the semi-permeable wall 8 into the solution 10, thereby reducing the concentration and osmotic pressure of solution 10. If, however, the osmotic pressure of solution 10 is, in the beginning, considerably higher than the osmotic pressure of solution 9, then the process will contine sufficiently long to cause solution 9 to become super-saturated and some of its salt will crystallize out. Seed pieces of the crystalline material to be grown may be planted in the solution 9 to facilitate the growth of a small number of large crystals.

The osmotic transfer of solvent will raise the level of the solution in compartment 7 and will decrease it in compartment 6. The resulting hydrostatic pressure difference between the liquids in the two compartments will, consequently, reduce the effectiveness of the osmotic action, and the action will continue only until the difference in osmotic pressures is counterbalanced by the difference in hydrostatic pressures.

Figure 2 illustrates schematically a device which does not allow the establishment of an appreciable hydrostatic pressure difference between the two compartments, and which maintains saturation in both of the solutions all the time. Accordingly, the process will continue substantially indefinitely and large crystals can be grown.

A container 11 holds a large supply of solution 12 of the crystalline material which is to be grown into crystals. Within the container 11 there is suspended a second container 13 by means of supports 15 the ends of which are fastened to the sides of the container 11. The bottom of the second container 13 is comprised of a semi-permeable wall or membrane 8 and is positioned below the surface of the liquid 12. Seed pieces 21 of the crystalline material may be planted in the solution 12 to facilitate the growing of a predetermined number of large crystals. The saturated solution 16 must have a higher osmotic pressure than the saturated solution 12. Within the container 13 there is placed a surplus of the solute 17 of the saturated second solution 16 so that the solvent which passes through the membrane 8 will not dilute the second solution 16, which would result in a reduction of its osmotic pressure. In this continuous process it is essential that the two solutions 12 and 16 have the same solvent; therefore, the solute 17 must be soluble in the solvent in which the crystalline material is dissolved.

The container 11 is closed by an air-tight cover 18. A pipe 19 extends through the air-tight packing 20 in the cover 18 into the container 13, terminating at the normal level of solution 16. A valve 25 is provided in the pipe 19 and the pipe leads into a sealed evaporating jar or chamber 22. Another pipe 23 extends into the evaporating jar 22 and its end 24 is positioned above the level of the solution 16' within the jar. A heater 26 is provided for vaporizing the liquid within the jar 22; the remaining residue 17' which results upon the vaporization of the solvent from solution 16' gathers at the bottom of the jar. The pipe 23 passes through a cooling unit or condenser 27 which has inlet and outlet openings 28 and 29 whereby cooling water may be passed around the pipe 23 to cause the vapor within the pipe to liquefy. The outlet of the condenser is connected to the inlet of a pump 30 and the pump outlet is connected to a pipe 31 which extends into the sealed jar 32.

The jar 32 contains a supply 33 of the material which is to be crystallized and a pipe 34 extends from the liquid level in the jar 32 through an air-tight packing 35 into container 11, terminating above the level of solution 12. Thus a circuit is established from container 13 through container 22, condenser 27, pump 30, container 32 back to container 11, and this circuit may be considered to be closed by the semi-permeable membrane 8 which permits solvent to pass from the container 11 to the container 13.

When the system is in operation the solvent of the saturated solution 12 in container 11 passes by osmotic action through the membrane 8 leaving its solute behind to cause a further increase in the concentration of the solution 12 and consequent growth of the crystal seeds 21. The saturated solution 16, containing the same kind of solvent as solution 12, does not become diluted by the incoming solvent because of the excess of solute 17 at the bottom of conainer 13. This excess dissolves gradually as more solvent enters container 13, thus re-establishing continuously saturation in solution 16. The level in container 13, at the same time, is maintained constant because the pipe 19, due to the suction established by pump 30, keeps the solution 16 in the container 13 at the normal level by removing accumulated excess solution 16' to the jar 22. The heater 26 vaporizes the solvent of solution 16', the vapor being drawn off through pipe 23 to the condenser 27 where it is returned to the liquid state, and the solute 17' remains in the jar 22. In order to facilitate vaporization of the solution 16' in jar 22 the valve 25 may be partially closed resulting in a pressure drop across it. A reduced pressure is thus obtained in the jar 22 resulting in a lowering of the boiling point temperature of the solution 16', therein. This prevents decomposition of compound 17' which might otherwise take place.

The solvent which comes out of the condenser 27 is used to again form a saturated solution of the substance to be crystallized by dissolving a quantity of substance 33 in jar 32, this substance being identical with the solute in solution 12. The solid material and solvent within the jar 32 may be stirred to facilitate the formation of fresh saturated solution. When equilibrium of the liquid flow is reached the pipe 34 extends to the surface of solution 12' in jar 32. Pump 30 causes the accumulating surplus of solution 12' to flow into the solution 12 in container 11, thereby continuously supplementing the solution 12 with exactly the same amount of liquid which is being lost due to crystallization of solute and osmotic transfer of solvent through the semi-permeable wall 8. In order not to disturb the equilibrium of solution 12 in container 11, the fresh saturated solution coming from container 32 must be brought to substantially the temperature of solution 12 before being added to it. This may be done by controlling the temperature of water or the like within the jacket 36 surrounding the pipe 34. Hot and cold water may be supplied to the jacket 36, and the flow thereof may be thermostatically controlled to regulate the temperature of the solution in pipe 34 in accordance with the temperature of the solution 12.

By this process the liquid levels in the two containers 11 and 13 are kept equal to prevent the osmotic transfer of solvent from slowing down which would occur if a difference in hydrostatic pressures in the two containers were allowed to build up. Also, the saturation of solution 16 in container 13 is maintained to keep the osmotic pressure difference between the two solutions constant.

When the crystals have grown to a sufficient size the cover 18 of the container 11 is removed, the crystals are taken out, the materials 17 and 33 are replenished, new seeds are planted and the cover is replaced. The apparatus is then ready for another run. It is to be noted that the material 17 is never used up. It is merely transferred, during the process, from container 13 into container 22 from which it can be returned into container 13 when required.

It is desirable that the seeds 21 be placed beneath the membrane 8 as it has been found that the supersaturated solution established at the underneath side of the membrane is sufficiently heavy with respect to the saturated solution that it moves downwardly without depositing crystalline material until it comes in contact with a seed about which growth will occur. The seeds 21, mounted on pedestals above the bottom of the container 11, act as nuclei and the crystalline material is thus caused to grow on these seeds.

In order to promote more rapid and uniform growth of the crystalline material the liquid contents of containers 11 and 13 may be agitated, for instance by stirring or rocking. Reference may be had to the Kjellgren Patent No. Re. 19,697 for a detailed description of rocking the liquid.

The membrane or semi-permeable wall 8 may consist of any one of a number of materials. One way of producing such a membrane or wall is to chemically deposit a colloidal metal-ferrocyanide within the pores of a plate of porous ceramic. The metal may be copper, nickel or the like, and the ceramic may be clay, unglazed porcelain, sintered glass, or any other suitable porous material. The metal-ferrocyanide is the active semi-permeable member in the form of many tiny membranes within the pores of the porous material which acts as a "skeleton" to support the membranes. Other types of semi-permeable walls may be formed of self-supporting films or skins of natural or of artificial origin such as animal or vegetable parchments, cellophane, collodion, or some of the synthetic resins.

In the process described in connection with Figure 1 it is not essential that the solvents in the two solutions be the same although they must be miscible. In the process described in connection with Figure 2 it is essential that the solvents be the same as the solvents mix together due to the continuity of the process. However, different solvents may be used in a process somewhat similar to the one shown in Figure 2, if these different solvents are separated somewhere, such, for example, as by a differential distillation process in connection with jar 22.

For obtaining crystals of a given crystalline material by the described device the only latitude in making the solution 12 is the choice of the solvent, and once the solvent is chosen the only latitude in making the second solution 16 is the choice of the solute. The solvent and the solutes must, however, be such as to produce in the second solution at least a somewhat higher osmotic pressure than in the first solution. The higher the osmotic pressure difference, however, the better, as the process will be faster. It is also desirable that the solute in the second solution be one with large molecules to prevent "back diffusion" through the membrane and consequent contamination of the first solution. This requirement is satisfied more often by organic than by inorganic substances. There are, however, only relatively few inexpensive solid organic compounds with a molar solubility high enough for the requirements of the method. A selection of some of them is tabulated below, together with their molar solubilities in water at 25 degrees centigrade:

| Compound | Molar Solubility |
|---|---|
| Sucrose, $C_{12}H_{22}O_{11}$ | 2.6 |
| d-Mannose, $C_6H_{12}O_6$ | 5.3 |
| d-Tartaric Acid, $C_2H_2(OH)_2(COOH)_2$ | 5.3 |
| Resorcinol, $C_6H_4(OH)_2$ | 6.5 |
| Urea, $CO(NH_2)_2$ | 10.5 |

Instead of solutions of solid organic substances, liquids with high osmotic pressure and miscible with or soluble in the solvent of the first solution may also be used in place of the second solution. The heavy alcohols, for example, glycerol, usually satisfy the requirements. In some cases inorganic compounds (electrolytes) with high solubility may also serve the purpose.

It has been pointed out that it is important to establish a reasonably high difference between the osmotic pressures of the two solutions involved in the described method. In the beginning, however, the osmotic pressures as such are usually not known, but only the solubilities. These are, in high concentrates and in electrolytes, only a rough indication for the osmotic pressure to be expected. In general, it is, therefore, advisable for a given substance to be crystallized, to choose the solute of the second solution so that it has a substantially higher molar solubility than the substance to be crystallized. This "safety margin" should be established for three reasons: (1) The substance to be crystallized, usually an electrolyte, will have a higher osmotic pressure than that corresponding to its solubility, depending upon its degree of dissociation. (2) The effect of supersaturation will add another few percent to its solubility and osmotic pressure above the values for saturation. (3) A high osmotic pressure differential accelerates the process.

As an example, a few solubility data shall be given (at 25 degrees centigrade) of some inorganic compounds which may have to be crystallized. Sodium chloride has been listed as a representative of a substance with an almost horizontal solubility curve. It should be noted that in most any such case the difference in osmotic pressures can easily be increased by merely increasing the temperature at which the crystals are grown. The organic substances, as listed above, usually rapidly increase their solubility and osmotic pressure with temperature, while the solubility of a substance with essentially horizontal solubility curve hardly changes.

| Compound | Molar Solubility |
|---|---|
| Sodium Chloride, NaCl | 5.5 |
| Ammonium Phosphate (Mono), $NH_4H_2PO_4$ | 2.9 |
| Potassium Tartrate, $K_2C_4H_4O_6 \cdot \frac{1}{2}H_2O$ | 3.1 |
| Barium Chloride, $BaCl_2 \cdot 2H_2O$ | 1.7 |

It is also within the scope of my invention to replace the second solution 16 with a gas, for instance air, whose humidity is controlled. The solvent passing through the membrane will then evaporate on its outside, thus concentrating the solution within the container without the danger of contaminating it by dust.

The device for practicing the aforementioned electro-osmotic method is schematically illustrated in Figure 3. The physical set-up is the same as in the device shown in Figure 1, with the exception that two electrodes 40 and 41 made of platinum, carbon or some other inert material have been added. Each of the electrodes is in contact with the liquid in one of the compartments 6 and 7. A battery 42 is connected through an adjustable resistor 43 to the electrodes 40, 41 so that a direct current potential difference is established between the two compartments 6, 7. Such an arrangement increases the osmotic flow of solvent from one compartment into the other beyond the rate at which it occurs due to the osmotic pressure difference between the two compartments without the potential difference. The polarity and magnitude of the potential difference depends upon the nature and concentration of the two solutions.

While I have described my invention with a certain degree of particularity, it is to be understood that this description has been presented only by way of example, and that numerous changes in the steps of the method and numerous changes in the apparatus may be made without departing from the spirit and scope of the invention as hereinafter claimed.

I claim as my invention:

1. The method of growing a large clear crystal of a crystalline material whose solubility does not substantially increase with temperature which comprises the steps of: planting a seed piece of the crystal to be grown in a first substantially saturated solution of the crystalline material, transferring solvent out of said first substantially saturated solution by osmotic action through a semi-permeable membrane into a second solution having higher osmotic pressure and different solute than said first solution to cause said first solution to become supersaturated and to cause the solute of said first solution to deposit as crystalline material on said seed piece, and adding a fresh supply of substantially saturated first solution to said supersaturated solution while the solute of said first solution is being deposited on said seed piece.

2. The method of growing a large clear crystal of a crystalline material whose solubility does not substantially increase with temperature which comprises the steps of: planting a seed piece of the crystal to be grown in a first substantially saturated solution of the crystalline material, transferring solvent out of said first substantially saturated solution by osmotic action through a semi-permeable membrane into a second solution having higher osmotic pressure and having different solute than said first solution to cause said first solution to become supersaturated and to cause the solute of the first solution to deposit as crystalline material on said seed piece, and providing in said second solution an excess of the solute of said second solution to maintain said second solution saturated and at its highest possible osmotic pressure.

3. The process as set forth in claim 2, further characterized by adding, during the crystal growing process, a fresh supply of substantially saturated solution of the crystalline material to the supersaturated solution of said crystalline material.

OTTO KORNEI.

REFERENCES CITED

The following references are of record in the file of this patent:

UNITED STATES PATENTS

| Number | Name | Date |
|---|---|---|
| 1,777,057 | Urbain | Sept. 30, 1930 |
| 2,408,625 | Graham et al. | Oct. 1, 1946 |
| 2,424,273 | Haas | July 22, 1947 |

FOREIGN PATENTS

| Number | Country | Date |
|---|---|---|
| 20,380 | Great Britain | July 7, 1910 |
| 77,991 | Germany | Nov. 12, 1894 |

OTHER REFERENCES

Glasstone, Textbook of Physical Chemistry, 1940, 6th printing, page 642, Figure 144.